UNITED STATES PATENT OFFICE.

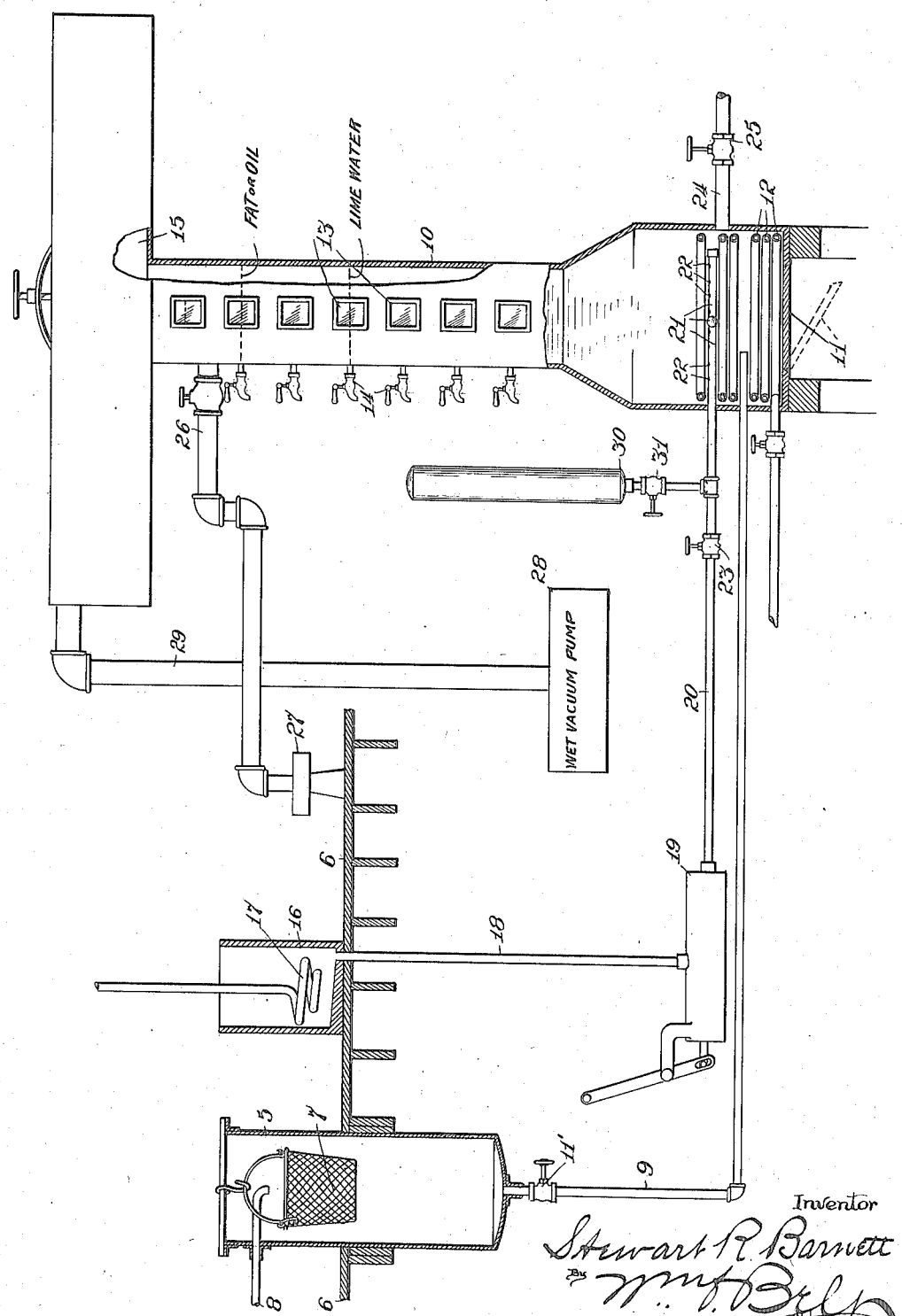

STEWART R. BARNETT, OF BELLEVILLE, WISCONSIN.

METHOD OF SUPERREFINING FATS.

1,271,118.  Specification of Letters Patent.  Patented July 2, 1918.

Application filed June 4, 1917. Serial No. 172,581.

*To all whom it may concern:*

Be it known that I, STEWART R. BARNETT, a citizen of the United States, residing at Belleville, in the county of Dane and State of Wisconsin, have invented certain new and useful Improvements in Methods of Superrefining Fats, of which the following is a specification.

My invention has for its primary object the provision of a method of removing the last traces of free fatty acids from alimentary fats and oils whereby all disagreeable taste and odor is eliminated therefrom making them suitable for human consumption either as such or in combination with other ingredients.

Further objects and advantages of my invention will be apparent as it is better understood by reference to the following specification when read in connection with the accompanying drawing which illustrates diagrammatically an apparatus in which the method may be carried out.

Fats and oils as produced by refiners and sold in the open market always contain a proportion of free fatty acids which, being disagreeable in odor and taste, render the fats and oils unsuitable for direct human consumption. The removal of the last traces of such fatty acids is extremely difficult and it is the purpose of my invention to provide a commercially practicable method for accomplishing this desirable result. In carrying out the invention I treat the fats or oils after first heating them to produce a sufficiently fluid condition, with a weak solution of lime or calcium oxid which is maintained in a heated condition until the free fatty acids are combined with a calcium oxid to form insoluble soaps. As the reaction proceeds slowly it is essential to thoroughly agitate the mixture over a considerable period of time after which the excess of calcium oxid is precipitated with carbon dioxid which settles with the soaps to the bottom of the container. The fat or oil is then withdrawn and will be found entirely free from the objectionable fatty acids and may be employed for example to replace milk fat and other expensive animal fats in making artificial cream, sugared condensed milk, compound evaporated milk, buttermilk, milk powder, ice-cream and other dairy products.

My invention is more fully explained hereafter in connection with the apparatus disclosed in the drawing, it being understood, however, that the drawing is merely illustrative and that the method is in no way limited to the particular apparatus shown. Referring to the drawing, 5 indicates the lime water receptacle which is preferably supported from the floor 6 so that the lime water may flow by gravity therefrom. A basket 7 is suspended within the receptacle 5 and an inlet pipe 8 is provided to deliver filtered water to the basket which contains a quantity of lime or calcium oxid. The percolation of the water through the lime results in the formation of a weak solution thereof which should not contain more than .14% of the calcium oxid. An outlet pipe 9 conveys the lime water from the receptacle 5 to the bottom of a tower of defecation apparatus 10, a suitable valve 11' being provided to regulate the flow of lime water. The tower 10 is supported so that a door 11 in the bottom thereof may be dropped to permit removal of the sludge formed in the latter part of the operation as hereinafter described. A steam coil 12 is provided within the tower adjacent the bottom to heat the lime water and maintain it at a temperature of substantially 200° F. A plurality of sight glasses 13 and petcocks 14 are provided in the upper portion of the tower in order that the reaction may be observed from time to time. The tower is enlarged at its top to form an expansion chamber 15.

Mounted on the floor 6, preferably adjacent the receptacle 5, is a jacketed receptacle 16 in which a steam coil 17 is disposed. This receptacle serves to heat the fat or oil to the required temperature after which it is withdrawn through the pipe 18 and delivered by means of a manually operated force pump 19 through the pipe 20 to a star 21 within the tower and provided with a plurality of openings 22 through which the fat or oil is delivered in a finely divided condition to the interior of the tower. A valve 23 is disposed in the pipe 20 to regulate the flow of fat or oil therethrough.

A pipe 24 is connected to the tower adjacent its bottom and a valve 25 therein regulates the flow of water through the pipe to the tower. Adjacent its top a pipe 26 connected with the interior thereof leads to a centrifugal separator and filter 27 which separates the refined oil from any water which may be carried over therewith at the conclusion of the operation. A wet vacuum pump 28 is connected by a pipe 29 to the interior of the expansion chamber 15. This pump serves to agitate the lime water and the fat or oil which rises therein to the upper part of the tower and the expansion chamber permits agitation of the contents of the tower without withdrawing any of the liquid therefrom. A cylinder 30 containing carbon dioxid under pressure is connected to the pipe 20 and delivery of the carbon dioxid to the interior of the tower is controlled by a valve 31.

In carrying out my method in the above-described apparatus a supply of lime water of the desired strength in quantity sufficient to neutralize the free fatty acids of the particular fat or oil to be treated is conveyed to the tower where it is heated to the desired temperature by the steam coil 12. The tower should be about three-fourths full as indicated by dotted lines on the drawing. The fat or oil is then heated in the receptacle 16 and forced by means of the pump 19 through the opening 22 in the star 21 and rises through the column of lime water, the top of the column should be below the level of the pipe 26. When all of the fat or oil has become stratified on the top of the column a small quantity of anhydrous sodium bi-carbonate equivalent to .002 of the original weight of the fat or oil is added to the contents of the tower, its function being that of a catalyzer to assist in the formation of the soaps. A cover is then adjusted to the top of the expansion chamber and the wet vacuum pump is started. The pump causes a violent agitation of the contents of the tower which insures contact of the lime water with every particle of the fat or oil. It, moreover, carries off the vile odors due to enzymic by-products, ketones and aldehydes which would otherwise be absorbed and retained in the purified fat or oil. The use of the vacuum also prevents any liability of injuring the flavor of the fat or oil by oxidation or destructive distillation.

The union of the free fatty acids with the lime takes place slowly and consequently agitation is continued for a period of six hours more or less and until the temperature has been reduced to substantially 150° F. The vacuum is then stopped and carbon dioxid is introduced to the column and distributed through the contents thereof until the excess of lime is converted into insoluble calcium carbonate which acts as a coagulant for the soaps and precipitates therewith as a sludge which carries down any extraneous impurities. The carbon dioxid is introduced in slight excess so that the refined fat or oil contains a minute quantity thereof which serves to prevent subsequent oxidation of the fat or oil.

The refining operation being complete water is introduced to the bottom of the tower and the fat or oil is lifted by the water and delivered through the pipe 26 to the centrifugal separator and filter where all traces of moisture are removed and the fat or oil is delivered in a filtered condition ready for use.

My invention is particularly useful in refining cocoanut oil which is a valuable substitute for animal fats in dairy products. It is equally useful, however, in refining peanut oil, olive oil, corn oil, cotton-seed oil, sesame oil, soya bean and other fats and oils. The application of my method results in marked improvements in the taste, odor and liability of oxidation of the oil treated.

Obviously the method is subject to variation within the scope of the appended claims without departing from the spirit and scope of the invention or sacrificing any of its material advantages, the form hereinbefore described being merely a preferred embodiment thereof.

I claim:

1. A method of super-refining fats and oils to remove free fatty acids therefrom which comprises agitating the fat or oil with heated lime water, precipitating the excess of lime with carbon dioxid, and separating the sludge including the lime soaps from the fat or oil.

2. A method of super-refining fats and oils to remove free fatty acids therefrom which comprises agitating the fat or oil with a large volume of heated lime water to form lime soaps and subsequently impregnating the fat or oil with carbon dioxid to prevent oxidation thereof.

3. A method of super-refining fats and oils to remove free fatty acids therefrom which comprises injecting the fat or oil into a column of heated lime water, agitating the mass over an extended period of time to form lime soaps, introducing carbon dioxid to precipitate the excess of lime, settling the solids and withdrawing the fat or oil from the top of the column.

4. A method of super-refining fats and oils to remove free fatty acids therefrom which comprises combining said acids with lime in the presence of a catalytic agent and separating the lime soaps from the fat or oil.

5. A method of super-refining fats and oils to remove free fatty acids therefrom which comprises combining said acids with lime in the presence of sodium bicarbonate and separating the lime soaps from the fat or oil.

6. A method of super-refining fats and oils to remove free fatty acids therefrom which comprises agitating the fat or oil with hot lime water in the presence of a small quantity of sodium bicarbonate and separating the lime soaps from the fat or oil.

7. A method of super-refining fats and oils to remove free fatty acids therefrom which comprises agitating the fat or oil with hot lime water in the presence of a catalytic agent, precipitating the excess of lime, and settling the sludge.

8. A method of super-refining fats and oils to remove free fatty acids therefrom which comprises heating the fat or oil, introducing it in a finely divided condition into a column of heated lime water, agitating the column, precipitating the excess of lime with carbon dioxid, settling the sludge and withdrawing the fat or oil from the top of the column.

9. A method of super-refining fats and oils to remove free fatty acids therefrom which comprises heating the fat or oil, introducing it in a finely divided condition into a column of lime water at a temperature of 200° F., agitating the column for six hours more or less, subsequently precipitating the excess of lime with carbon dioxid, and settling the sludge.

10. A method of super-refining fats and oils to remove free fatty acids therefrom which comprises agitating the fat or oil with lime water to form lime soaps and subsequently precipitating the excess of lime and impregnating the fat or oil with carbon dioxid to prevent oxidation thereof.

11. A method of super-refining fats and oils to remove free fatty acids therefrom which comprises agitating the fat or oil with lime water in the presence of a catalyzer to form lime soaps and subsequently precipitating the excess of lime and impregnating the fat or oil with carbon dioxid to prevent oxidation thereof.

STEWART R. BARNETT.

Witnesses:
H. McCaslin,
Ida Voegeli.